United States Patent
Nolting, Jr. et al.

[11] Patent Number: 6,123,343
[45] Date of Patent: Sep. 26, 2000

[54] CART BRAKING MECHANISM

[76] Inventors: Herman F. Nolting, Jr., 1042 S. 130th St., Bonner Springs, Kans. 66012; Robert E. Doughty, 6745 W. 52nd Pl., Apartment 1A, Mission, Kans. 66202; Gary A. Barnhart, 4927 Southridge, Roeland Park, Kans. 66205

[21] Appl. No.: 08/987,592

[22] Filed: Dec. 9, 1997

[51] Int. Cl.[7] .................................................. B62D 39/00
[52] U.S. Cl. ........................ 280/33.994; 188/19; 188/4 B
[58] Field of Search .................................. 188/19, 29, 20, 188/21, 22, 23, 2 F, 4 B, 4 R, 5; 280/33.994

[56] References Cited

U.S. PATENT DOCUMENTS

| | | |
|---|---|---|
| 531,997 | 1/1895 | Hazen ........................................ 188/23 |
| 2,958,537 | 11/1960 | Young . |
| 3,061,049 | 10/1962 | Bramley . |
| 3,095,211 | 6/1963 | Altherr . |
| 3,117,653 | 1/1964 | Altherr . |
| 3,376,954 | 4/1968 | Neptune . |
| 3,458,015 | 7/1969 | Collins et al. . |
| 3,501,164 | 3/1970 | Peterson . |
| 3,532,188 | 10/1970 | Keiz . |
| 3,687,241 | 8/1972 | Fontana . |
| 4,018,449 | 4/1977 | Anderson . |
| 4,109,740 | 8/1978 | Andruchiw ............................... 188/23 |
| 4,116,464 | 9/1978 | Haley . |
| 4,545,591 | 10/1985 | Balha . |
| 4,768,622 | 9/1988 | Nicklasson et al. . |
| 4,840,388 | 6/1989 | Doughty . |
| 4,976,447 | 12/1990 | Batson . |
| 5,046,748 | 9/1991 | Oat-Judge . |
| 5,090,517 | 2/1992 | Doughty . |
| 5,288,089 | 2/1994 | Bowers et al. . |
| 5,325,938 | 7/1994 | King . |
| 5,456,336 | 10/1995 | Bopp . |
| 5,465,986 | 11/1995 | MacRae . |
| 5,499,697 | 3/1996 | Trimble et al. . |

FOREIGN PATENT DOCUMENTS

| | | |
|---|---|---|
| 0509786A2 | 4/1992 | European Pat. Off. . |
| 2554776A | 10/1983 | France . |
| 3045302A1 | 7/1982 | Germany . |
| WO 8403073 | 2/1983 | WIPO . |

*Primary Examiner*—Robert J. Oberleitner
*Assistant Examiner*—Mariano Sy
*Attorney, Agent, or Firm*—Hovey, Williams, Timmons & Collins

[57] ABSTRACT

A braking mechanism (20) for a grocery cart or the like is disclosed as including a braking assembly (50) that is selectively shiftable between braking and non-braking positions and a handle assembly (52) interconnected to the braking assembly (50) for effecting the selective brake assembly shifting. The braking assembly (50) includes a chock element (60) shiftably mounted adjacent at least one of the cart wheels (26) and configured for wedging engagement between the periphery (65) of the wheel (26) and the support surface (66) to impede forward movement of the cart (22). The handle assembly (52) includes a tubular body (112) for fitting over the existing cart handle (28) and a pair of rotor cup assemblies (118, 120) supporting the tubular body (112) on the cart body (24, for selective pivotal movement substantially about the longitudinal axis of the cart handle (28). In operation, the user grasps and pivots the tubular body (112) for corresponding shifting of the braking assembly (50) from the braking position to the non-braking position thereof. Once the tubular body (112) is released by the user, coil spring (192) disposed within at least one of the rotor cups (118, 120) biases the braking assembly (50) toward the braking position thereof.

27 Claims, 2 Drawing Sheets

U.S. Patent        Sep. 26, 2000        Sheet 1 of 2        6,123,343
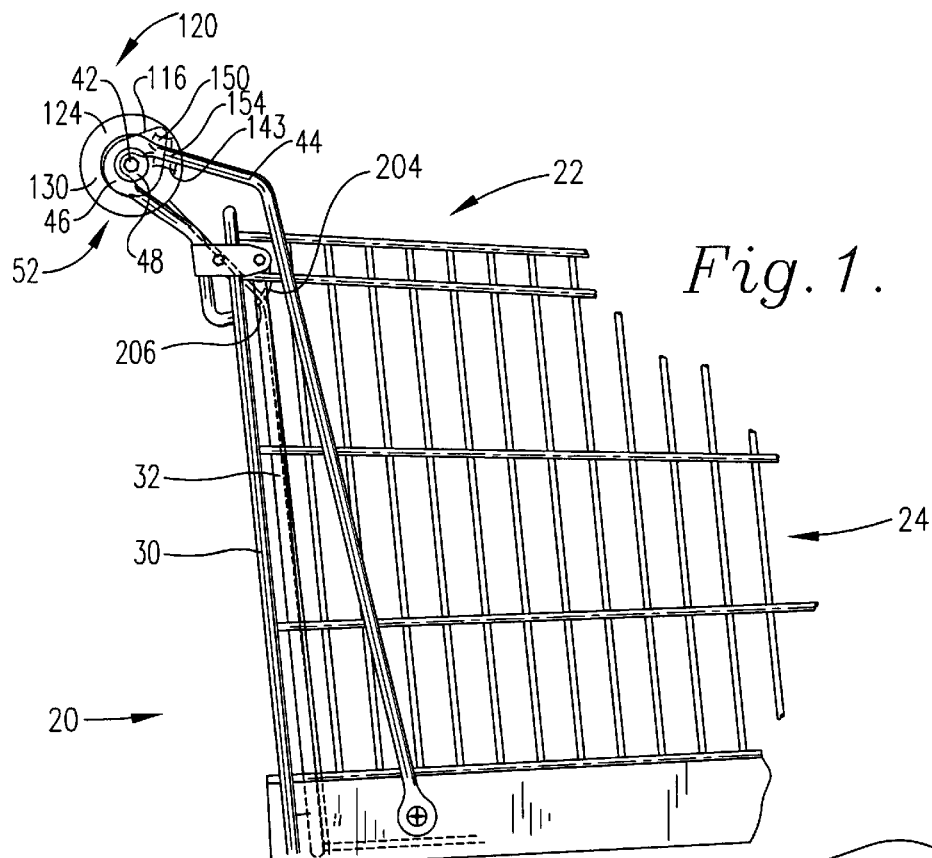
Fig. 1.
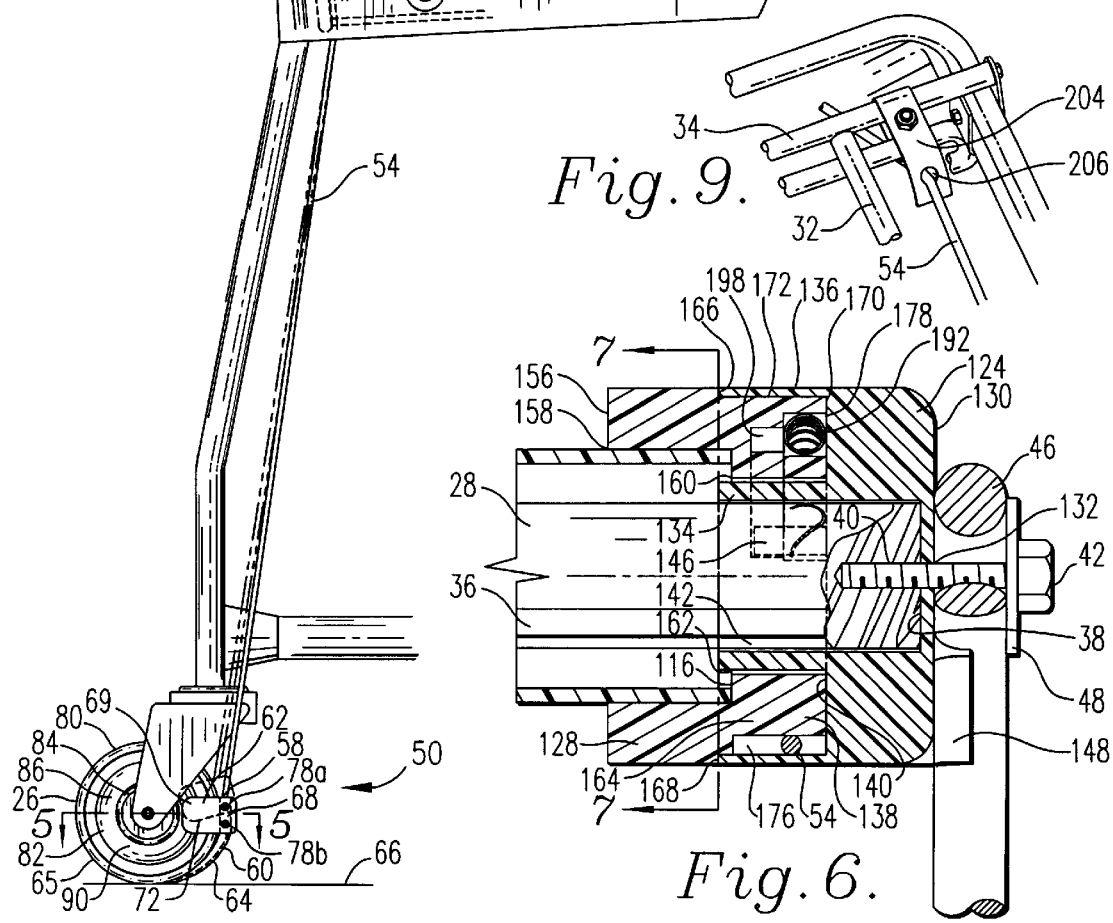
Fig. 9.
Fig. 6.

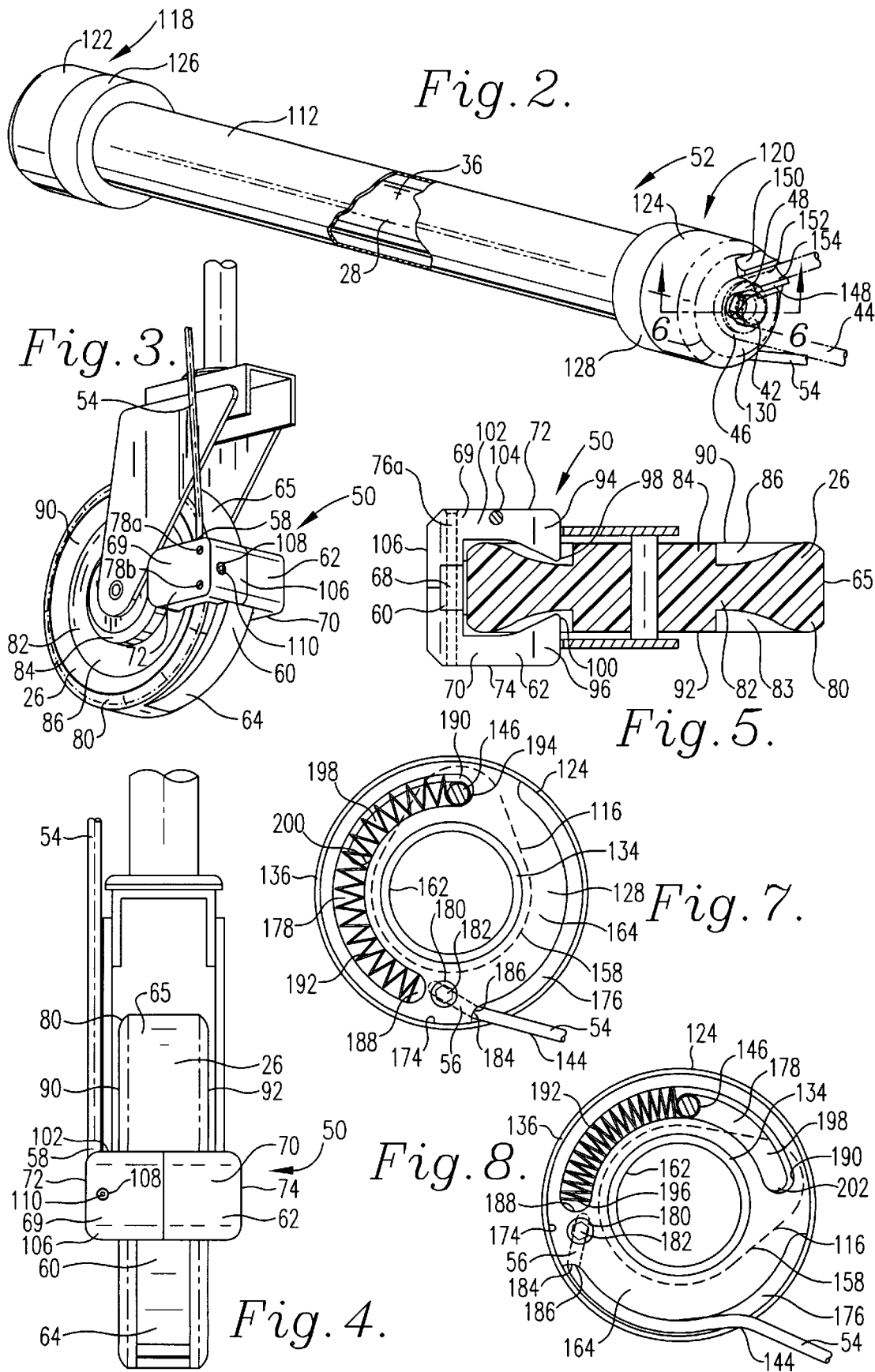

CART BRAKING MECHANISM

BACKGROUND OF THE INVENTION

1. Field of the Invention

The present invention broadly relates to an improved braking mechanism adaptable for wheeled grocery carts, luggage carts and the like. More particularly, the invention pertains to such a braking mechanism including a braking assembly comprising a chock element mounted adjacent at least one of the cart wheels and designed for wedging engagement between the cart wheel periphery and the support surface for braking purposes, and a handle assembly interconnected to the braking assembly and configured for easily fitting over the existing handle of the cart and providing selective pivotal movement for corresponding shifting of the braking assembly between braking and non-braking positions.

2. Description of the Prior Art

Shopping carts, grocery carts and the like may present an immediate hazard to persons and property if such carts are permitted to move freely when unattended by the user. The potential for cart accidents may increase substantially if, for example, the cart is heavily loaded or traveling on an inclined surface. In addition, small children occupying a child seat secured to the cart may also be at significant risk in a free-wheeling cart. Accordingly, braking mechanisms for carts have been developed to eliminate such concerns by providing a means for impeding cart movement when the cart is left unattended.

A number of cart braking mechanisms have been proposed in the past, as evidenced by the disclosures of U.S. Pat. Nos. 3,501,164, 4,840,388, 4,976,447, 5,090,517, and 5,288,089. The devices of the prior art, however, have several notable drawbacks. The most common problem with the prior art devices is the complex nature of the braking mechanism. Braking mechanisms which are not simple and quick to install on an existing cart pose a monumental problem when a multitude of carts must be retrofitted, such as carts for a supermarket or an airport. The complexity of such braking mechanisms is readily apparent by the failure of cart manufacturers to incorporate such braking mechanisms into the design for their finished cart product.

The braking mechanisms of the prior art are typically unavailable at a low cost and also have a tendency to be difficult for some users to operate. For example, persons suffering from arthritis or other diseases or injuries affecting the joints of the hand may be unable to effectively manipulate the handle assembly or other release mechanism in order to disengage the cart brake. Another problem with prior devices is that the appearance and operation of the cart may be significantly altered by installation of the braking mechanism, such as continuous damage to the cart wheels by the structure of the braking assembly.

SUMMARY OF THE INVENTION

The problems outlined above are in large measure solved by the braking mechanism in accordance with the present invention. That is to say, the braking mechanism hereof is specially designed to be easily and quickly installed on a cart, simple to operate, and a cost effective means for impeding the forward movement of free-wheeling carts which have been left unattended.

The braking mechanism of the present invention broadly includes a braking assembly comprising a chock element shiftably mounted adjacent at least one of the cart wheels for selective shifting between a braking position and a non-braking position, and a handle assembly interconnected to the braking assembly for effecting the selective brake assembly shifting. The chock element includes a wedge structure for wedging engagement between the periphery of said one wheel and the support surface when the chock element is in the braking position, and a retaining structure for captive retention of the chock element adjacent said wheel and for selective shiftable movement of the chock element relative to said wheel between the braking and non-braking positions. The handle assembly includes a tubular body, graspable by a user, telescoped over the existing cart handle, and coupling means pivotally supporting each end of the tubular body on the body of the cart. The coupling means provides for selective pivotal movement of the tubular body substantially about the longitudinal axis of the cart handle for corresponding shifting of the braking assembly from the braking position to the non-braking position when the user grasps and pivots the tubular body. The coupling means comprise a pair of rotor cup assemblies each being interposed between a respective end of the tubular body and the cart body. Each respective rotor cup assembly includes a stationary end cap fixed to the cart body and a pivotal element pivotally secured to the end cap and configured for receiving and supporting the tubular body and permitting the selective pivotal movement of the tubular body. The handle assembly further includes biasing means disposed within at least one of the rotor cup assemblies for biasing the braking assembly toward the braking position thereof when the handle assembly is released by the user. The means for interconnecting the handle assembly and the braking assembly is provided by a connection cable extending vertically alongside the cart body.

A grocery cart typically has a rearwardly disposed nesting panel which pivots between an open position and a closed position. This panel permits the nesting of numerous carts when the panel is pivoted to the open position. Preferably, the braking mechanism of the present invention provides an interconnection between the nesting panel and the braking assembly for correspondingly shifting the chock element to the non-braking position when the panel pivots to the open position in order to allow unimpeded movement of the nested carts.

Other preferred aspects of the present invention will become clear from the detailed description hereinbelow.

BRIEF DESCRIPTION OF THE DRAWINGS

FIG. 1 is a fragmentary view of the preferred brake mechanism of the invention, shown mounted to a grocery cart and shifted to its braking position, and illustrating in phantom the braking mechanism shifted to the non-braking position;

FIG. 2 is a perspective view of the handle assembly of the braking mechanism, which further illustrates a pair of rotor cup assemblies and a tubular body supported therebetween, with portions of the handle assembly broken-away to reveal the cart handle;

FIG. 3 is a perspective view of the braking assembly of the braking mechanism, shown mounted to one of the cart wheels and shifted to its braking position, and further illustrating the wedging position of the chock element and the retaining structure for mounting the chock element adjacent the wheel;

FIG. 4 is a front elevational view of the braking assembly of FIG. 3 shown in its braking position;

FIG. 5 is a sectional view taken along the line 5—5 of FIG. 1, which illustrates the retaining structure for mounting the chock element adjacent the wheel;

FIG. 6 is a fragmentary sectional view taken along the line 6—6 of FIG. 2, which illustrates a handle assembly end wherein a tubular body end is pivotally supported by a rotor cup assembly;

FIG. 7 is a sectional view taken along the line 7—7 of FIG. 6, which illustrates the handle assembly in its rest position for corresponding location of the braking assembly to the braking position thereof;

FIG. 8 is a sectional view similar to that of FIG. 7, wherein the handle assembly is pivoted for corresponding shifting of the braking assembly to the non-braking position thereof; and FIG. 9 is an enlarged fragmentary perspective view of the nesting bracket secured to a cross brace of the nesting panel and the connection cable passing therethrough.

DETAILED DESCRIPTION OF THE PREFERRED EMBODIMENT

Turning now to the drawings, FIG. 1 illustrates a preferred braking mechanism (herein designated by numeral 20) in accordance with the present invention mounted on a more or less conventional grocery cart 22, generally known in the industry as a Unarco shopping cart. Cart 22 includes a cart body 24, left and right front and rear wheels (only the right rear wheel 26 is shown), a rigid transverse cart handle 28 mounted adjacent the rearward end 30 of body 24, and a rear nesting panel 32 hingedly coupled with cross brace 34. Cart handle 28 includes an elongated, integrally constructed metallic member 36 presenting opposed ends (only one end 38 is shown) each defining a threaded bore 40 for receiving a mounting bolt 42. Cart body 24 further includes a pair of left and right handle braces (only the right brace 44 is shown) mounted adjacent the rearward sides of body 24 and supporting cart handle 28 therebetween, each handle brace 44 being configured for presenting a connection loop 46. A washer 48 engages the outer face of loop 46 as shown, and permits passage of bolt 42 therethrough for threadable receipt by bore 40. It will be appreciated by those skilled in the art, however, that the teachings of the present invention may be applicable to grocery or shopping carts designed by other manufacturers, as well as other type of wheel-based carts, such as luggage carts.

The braking mechanism 20 hereof broadly includes a braking assembly 50 mounted adjacent wheel 26 and selectively shiftable between a braking position for impeding forward cart movement and thereby braking cart 22 and a non-braking position for permitting unimpeded cart movement, a handle assembly 52 pivotally coupled to cart handle 28 for effecting said selective brake assembly shifting, and a connection cable 54, presenting an upper end 56 and a lower end 58, which interconnects handle assembly 52 with braking assembly 50. In preferred forms, braking mechanism 20 includes left and right structures comprising braking assemblies and connection cables for mounting adjacent both rear wheels which are similar in all respects except handedness. A single reference numeral shall therefore be used to designate both left and right structures of any such pair, unless noted otherwise. Moreover, while the construction and operation of the overall braking mechanism 20 is described only with reference to a single braking assembly 50 and cable 54, it will be appreciated that this description is applicable to both braking assembly pairs.

Braking assembly 50 includes a chock element 60 and a retaining structure 62 for operatively mounting chock element 60 adjacent wheel 26, and each such component is preferably fabricated from any suitable synthetic resin material such as ultra high molecular weight polymer. It will be observed that chock element 60 includes an arcuate lower wedge structure 64 for wedging engagement between the periphery 65 of wheel 26 and the support surface 66. As best illustrated in FIGS. 3–5, retaining structure 62 provides captive retention of chock element 60 adjacent wheel 26 and allows selective shiftable movement of chock element 60 relative to wheel 26.

Chock element 60 presents an upper member 68, disposed above wedge structure 64, which is coupled to retaining structure 62. Retaining structure 62 is generally U-shaped and comprises a pair of retaining arms 69, 70, each presenting an outboard face 72, 74. A pair of parallel attachment holes 76 extends transversely between outboard faces 72, 74 and through the retaining structure 62 for threadably receiving screws 78a, 78b and connecting the parts of structure 62.

Wheel 26 includes a rim 80, a recessed body portion 82, and a central hub 84. The portion 82 presents a pair of annular recess areas 86, 88 adjacent opposing inboard and outboard faces 90, 92 of wheel 26, as illustrated in FIGS. 3 and 5. Retaining arms 69, 70 of the chock element 60 respectively include inward extending jaw elements 94, 96, each presenting a tip 98, 100, and configured for inwardly extending into a respective recess areas 86, 88, with the distance between each respective tip 98, 100 being less than the width of rim 80, thereby insuring captive retention of chock element 60 adjacent wheel 26. Moreover, such tip distance is slightly greater than the width of portion 82, thereby allowing selective shiftable movement of chock element 60 relative to wheel 26. In other words, the chock element 60 is shiftably mounted on the rotable exterior of the wheel 26. The chock element 60 consequently does not need to be, nor is it, supported on the cart body 24, but rather the chock element 60 is virtually entirely supported on the wheel 26. Retaining arm 69 adjacent outboard face 90 of wheel 26 presents an upper margin 102 providing a cable hole 104 adapted for receiving lower end 58 of connection cable 54. The retaining arm 69 also presents a front face 106 having an aperture 108 for threadably receiving a set screw 110 for coupling connection cable 54 to retaining structure 62 within cable hole 104.

In preferred forms, the combined weight of chock element 60 and retaining structure 62 biases braking assembly 50 toward the braking position thereof. That is to say, the combined weight of chock element 60 and retaining structure 62 normally causes wedge structure 64 to shift downward between periphery 65 of wheel 26 and the support surface 66 for impeding forward cart movement and thereby braking cart 22. This means of biasing eliminates the need for mounting an additional mechanism near wheel 26 to provide such biasing, as often disclosed in the prior art.

Handle assembly 52 includes an elongated tubular body 112 presenting two opposing ends 116 (FIG. 6) configured for telescopic placement over rigid cart handle 28. The body 112 is supported by a pair of rotor cup assemblies 118, 120 for pivoting movement on cart body 24. Tubular body 112 is preferably configured to be oblong or somewhat tear drop shaped in cross section and thus easily graspable by a user, and is preferably fabricated from polyvinyl chloride or any other suitable material. Each rotor cup assembly 118, 120 includes a stationary end cap or stator 122, 124 for mounting to cart body 24, and a pivotal element or rotor 126, 128 pivotally received within respective end cap 122, 124. End caps 122, 124 and pivotal elements 126, 128 are all of integral construction and each are preferably fabricated from any suitable synthetic resin material such as ultra high molecular weight polymer. In operation, rotor cup assemblies 118, 120 permit selective pivotal movement of tubular body 112 substantially about the longitudinal axis of cart handle 28 for corresponding selective movement of braking assembly 50.

Each end cap or stator 122, 124 is cup shaped in configuration and presents a circular outboard wall 130 having a centrally located aperture 132 for receiving bolt 42 therethrough, and inwardly extending, concentric inner and outer walls 134, 136. An annular cavity 138 is defined by walls 134, 136 and annular cavity bottom 140. A central socket 142 is defined by inner wall 134 for receiving cart handle end 38 and has a depth greater than the depth of annular cavity 138 (see FIG. 6). Outer wall 136 is provided with an oval-shaped opening 144 for receiving connection cable 54 therethrough (see FIG. 7). A lug 146, preferably fabricated from metal or other suitable material, is secured to and extends from cavity bottom 140 and is positioned substantially midway between inner and outer walls 134, 136. It will be observed (FIG. 6) that handle end 38, bore 40, socket 142, aperture 132, loop 46, washer 48 and bolt 42 are all coaxially aligned. Outboard wall 130 also includes a pair of parallel, outwardly extending walls 148, 150 presenting an arcuate channel 152 therebetween. The channel 152 is located along a chord of wall 130 and receives an upper segment 154 of loop 46 (as shown in phantom in FIG. 2) to thereby lock end caps 122, 124 in place.

As best illustrated in FIGS. 6 and 7, each pivotal element or rotor 126, 128 is substantially cylindrical in shape and includes an inboard margin 156 having an oblong or somewhat tear drop shaped opening 158 for receiving tubular body 112, an intermediate abutment surface 160 for engaging tubular body end 116 and a centrally located circular passage 162 for allowing inner wall 134 of end cap 122 or 124 to protrude therethrough. The pivotal elements 126, 128 also have an outwardly projecting connection portion 164 configured for telescopic receipt within a corresponding end cap 122, 124. Connection portion 164 provides a lip 166 for engagement by edge 168 of outer wall 136, an outboard face 170 for engaging cavity bottom 140, and a periphery 172 for engaging inward face 174 of outer wall 136. Connection portion 164 further includes an arcuate cableway 176 extending inwardly from periphery 172 for receiving connection cable 54, an arcuate spring recess 178 positioned substantially midway between periphery 172 and passage 162, and an aperture 180 for threadably receiving a set screw 182. Cableway 176 presents an end 184 adjacent aperture 180 having a cable hole 186 for receiving upper end 56 of connection cable 54 and securing connection cable 54 to pivotal element 128 via set screw 182. Spring recess 178, presenting a forward end 188 adjacent the aperture 180 and an opposing rearward end 190, is configured for retaining a coil spring 192 therein. Spring 192 presents a looped end 194 for coupling with lug 146 and an opposing non-looped end 196. Spring recess 178 further provides an arcuate slot 198, presenting opposing inward and outward ends 200, 202, for receiving lug 146, which outward end 202 is co-terminus with rearward end 190 of spring recess 178.

FIG. 7 illustrates handle assembly 52 in its rest or non-engaged position, which corresponds to the braking position of braking assembly 50. Specifically, tubular body 112 and pivotal elements 126, 128 are located with coil springs 192 relaxed, lugs 146 are engaging the outward ends 202 of slots 198, and connection cables 54 are slack. In this orientation, the weight of braking assembly 50 causes downward shifting thereof relative to the wheel 26 thereby causing wedge structure 64 to wedgingly engage between periphery 65 of wheel 26 and the support surface 66 for impeding forward cart movement (as shown in bold lines in FIG. 1).

FIG. 8 depicts the handle assembly 52 in the engaged position, which corresponds to the non-braking position of braking assembly 50. As illustrated, tubular body 112 and pivotal elements 126, 128 are collectively pivotally shifted so that coil springs 192 are compressed, slots 198 are correspondingly shifted thereby causing lugs 146 to engage inward ends 200 of slots 198, and connection cables 54 are reeled into cableways 176. As connection cable 54 is thus shifted, the lower end 58 thereof moves upwardly and the retaining structure 62 is correspondingly shifted upward relative to wheel 26. This causes wedge structure 64 to be disengaged from wedging engagement between periphery 65 of wheel 26 and the support surface 66 for permitting unimpeded forward cart movement (as shown in phantom in FIG. 1). It should be noted that the compression of coil springs 192 creates a biasing force urging the shifting of pivotal elements 126, 128 and tubular body 112 back to the rest position thereof and corresponding shifting of the braking assembly 50 to the braking position thereof.

Those skilled in the art will appreciate that the selective pivotal movement of tubular body 112 substantially about the longitudinal axis of cart handle 28 is essentially defined by the arcuate length of slots 198. That is to say, the shifting of the tubular body 112 by a user is limited to the corresponding shifting of inward and outward ends 200, 202 of slots 198 about lugs 146.

The braking assemblies 50 may also be shifted from the braking position to the non-braking position in the event cart 22 telescopically receives another cart in a nesting configuration. In such nesting configuration, unimpeded cart movement will be necessary in order to allow a series of nested carts to be pushed freely. Upon nesting, the forward end of the trailing cart (not shown) engages the rearward end 30 of cart 22 thereby causing nesting panel 32 to swing upwardly about cross brace 34. Such upward swinging movement of nesting panel 32 causes corresponding shifting of nesting bracket 204, which is U-shaped in configuration and secured to cross brace 34. The bracket 204 presents a hole 206 for passage of connection cable 54 therethrough (see FIG. 9). Shifting of nesting bracket 204 tensions cable 54 and causes upward shifting of the lower end 58 of the connection cable 54. This in turn causes upward shifting of retaining structure 62 relative to wheel 26 thereby causing wedge structure 64 to be disengaged from wedging engagement between periphery 65 of wheel 26 and the support surface 66.

Upon removal of the trailing cart from the nested configuration with cart 22, nesting panel 32 shifts downward to its downward position (see FIG. 1), and corresponding shifting of nesting bracket 204 allows connection cable 54 to go slack. This results in gravity-induced downward shifting of retaining structure 62 relative to wheel 26 and the wedging engagement of wedge structure 64 between periphery 65 of wheel 26 and the support surface 66. It should be noted that inadvertent cart separation causes the braking assembly of the separated cart to automatically engage.

Another means of shifting braking assembly from the braking position to the non-braking position could include the use of a bail installed on the forward end of cart (not shown) and interconnected with connection cable 54 by a front cable (not shown) running preferably underneath the cart body 24, as essentially disclosed by U.S. Pat. No. 5,499,697. Lifting of the bail causes retraction of said front cable which thereby results in removal of slack from connection cable 54, upward shifting of lower end 58 of connection cable 54, and corresponding upward shifting of retaining structure 62 relative to wheel 26. Such bail would be extremely useful, for example, for disengaging the braking assembly 50 in order to remove a forward cart from a series of nested carts.

The braking mechanism 20 of the present invention is designed not only for use in the manufacturing of new carts, but is equally suitable for simple and quick retrofitting of existing carts by unskilled personnel. Braking mechanism 20 can be provided in kit form with four basic components comprising handle assembly 52, connection cable 54, nesting bracket 204 and braking assembly 50. To retrofit an existing cart 22, each bolt 42 is unscrewed from cart handle 28 and handle 28 is then removed from between each loop 46. Connection cable 54 is threaded through outer wall opening 144 of end cap 124 and secured within cable hole 186 of pivotal element 128 using set screw 182. Looped end 194 of coil spring 192 is secured around lug 146 and then pivotal element 128 is mated with end cap 124 so that coil spring 192 is retained within spring recess 178 and lug 146 extends into slot 198. The installation of connection cable 54 during such assembly will only be required for each rotor cup assembly 118, 120 corresponding to a wheel 26 being retrofitted with a braking assembly 50. Tubular body 112 is slipped over cart handle 28 and rotor cup assemblies 118, 120 are placed on each tubular body end 116, thus completing handle assembly 52. Handle assembly 52 is then secured between each loop 46 by reinstalling each bolt 42 through respective washer 48, loop 46 and aperture 132 for threaded engagement with bore 40 of cart handle end 38 (see FIG. 6). Next, braking assembly 50 is installed on wheel 26 by placing each retaining arm 69, 70 adjacent respective wheel faces 90, 92 so that each jaw element 94, 96 extends into a respective recess area 86, 88. Upper member 68 of chock element 60 is then secured by mounting screws 78a, 78b within respective attachment holes 76, (see FIGS. 3 and 5). Connection cable 54 is then threaded downwardly from each respective rotor cup assembly 118, 120 through hole 206 of nesting bracket 204, along the rearward end 30 of cart body 24, and is secured within cable hole 104 of retaining structure 62 using set screw 110.

Those skilled in the art will appreciate that the teachings of the braking mechanism 20 hereof may include a variety of embodiments in addition to the preferred embodiment hereinabove described. For example, depending on the type of cart involved, the size, shape and arrangement of components may require appropriate modification. Having thus described the preferred embodiment of the present invention, the following is claimed as new and desired to be secured by Letters Patent:

We claim:

1. A cart comprising:

a cart body;

a plurality of rotatable support wheels operatively coupled to said cart body for moveably supporting the cart body on a support surface, with each of the wheels presenting a periphery; and a braking mechanism being operatively connected to said cart and including a braking assembly that is selectively shiftable into and out of a braking position in which forward movement of the cart body is impeded, said braking assembly including a shiftable chock element having at least a portion thereof that is located generally forward of one of the wheels and is configured for selective wedging engagement between the periphery of the one wheel and the support surface when the braking assembly is in the braking position, said cart body having a rearwardly disposed nesting panel pivotal between an open position and a closed position for allowing nesting of a plurality of carts when said panel is pivoted to said open position, said cart further including means interconnecting said nesting panel with said braking mechanism for shifting said braking assembly out of the braking position when the panel pivots to said open position.

2. A cart comprising:

a cart body;

a plurality of rotatable support wheels operatively coupled to said cart body for moveably supporting the cart body on a support surface, with each of the wheels presenting a periphery; and a braking mechanism being operatively connected to said cart and including a braking assembly that is selectively shiftable into and out of a braking position in which forward movement of the cart body is impeded, said braking assembly including a shiftable chock element having at least a portion thereof that is located generally forward of one of the wheels and is configured for selective wedging engagement between the periphery of the one wheel and the support surface when the braking assembly is in the braking position, said braking mechanism including operating means mounted on said cart body and operatively coupled with said braking assembly for effecting said selective brake assembly shifting, said cart body presenting a forward end and a rearward end and having a rigid transverse cart handle mounted adjacent said rearward end, said cart handle presenting a longitudinal axis, said braking assembly including at least one operating element, said operating means including a handle assembly mounted on said cart body and operatively coupled with said braking assembly for effecting said selective brake assembly shifting, said handle assembly comprising a tubular body, graspable by a user, telescoped over said cart handle and presenting two opposing ends, coupling means pivotally supporting said tubular body ends on the cart body for selective pivotal movement of the tubular body substantially about said longitudinal axis of the cart handle for corresponding shifting of said braking assembly out of said braking position when a user grasps and pivots said tubular body, and biasing means operably coupled to the tubular body for biasing said braking assembly toward said braking position, said operating element including an elongated element extending along the cart body and interconnecting the handle assembly with said braking assembly.

3. A cart comprising:

a cart body presenting a forward end and a rearward end and having a rigid transverse cart handle mounted adjacent said rearward end, said cart handle presenting a longitudinal axis; and a braking mechanism operatively connected to said cart including a braking assembly selectively shiftable between a braking position for impeding cart movement and thereby braking the cart and a non-braking position for permitting unimpeded cart movement, said braking assembly including braking structure and at least one operating element; and a handle assembly mounted on said cart body and operatively coupled with said braking assembly for effecting said selective brake assembly shifting, said handle assembly comprising a tubular body, graspable by a user, telescoped over said cart handle and presenting two opposing ends, coupling means pivotally supporting said tubular body ends on the cart body for selective pivotal movement of the tubular body substantially about said longitudinal axis of the cart handle for corresponding shifting of said braking assembly from said braking position to said non-braking position when a user grasps and pivots said tubular body, and biasing means proximal to and operably coupled with the tubular body for biasing said braking assembly toward said braking position, said operating element including an elongated element extending along the cart body and interconnecting the handle assembly with said braking assembly.

4. The cart as set forth in claim 3, said cart having a plurality of support wheels operatively coupled to said cart body, each presenting a periphery, for rotatable support of said cart body on a support surface, said braking structure including a chock element mounted adjacent at least one of said wheels for selective movement of the chock element between said braking and non-braking positions thereof, said chock element including wedge structure for wedging engagement between the periphery of said one wheel and said support surface when the chock element is in said braking position for braking said wheel and thereby braking said cart.

5. The cart as set forth in claim 3, said coupling means comprising a pair of rotor cup assemblies, each rotor cup assembly interposed between a respective end of the tubular body and the cart body and each rotor cup assembly including a stationary end cap fixed to the cart body and a pivotal element pivotally secured to said end cap and configured for receiving and supporting said tubular body and permitting said selective pivotal movement of the tubular body.

6. A cart comprising:
   a cart body presenting a forward end and a rearward end and having a rigid transverse cart handle mounted adjacent said rearward end, said cart handle presenting a longitudinal axis; and
   a braking mechanism operatively connected to said cart including
      a braking assembly selectively shiftable between a braking position for impeding cart movement and thereby braking the cart and a non-braking position for permitting unimpeded cart movement, said braking assembly including braking structure and at least one operating element; and
      a handle assembly mounted on said cart body and operatively coupled with said braking assembly for effecting said selective brake assembly shifting, said handle assembly comprising a tubular body, graspable by a user, telescoped over said cart handle and presenting two opposing ends, coupling means pivotally supporting said tubular body ends on the cart body for selective pivotal movement of the tubular body substantially about said longitudinal axis of the cart handle for corresponding shifting of said braking assembly from said braking position to said non-braking position when a user grasps and pivots said tubular body, and biasing means disposed within said handle assembly for biasing said braking assembly toward said braking position,
   said operating element including an elongated element extending along the cart body and interconnecting the handle assembly with said braking assembly,
   said coupling means comprising a pair of rotor cup assemblies, each rotor cup assembly interposed between a respective end of the tubular body and the cart body and each rotor cup assembly including a stationary end cap fixed to the cart body and a pivotal element pivotally secured to said end cap and configured for receiving and supporting said tubular body and permitting said selective pivotal movement of the tubular body,
   said biasing means including an arcuate coil spring disposed within each rotor cup assembly for biasing said braking assembly toward said braking position.

7. A retrofit kit adapted for mounting on a cart having a cart body, a plurality of support wheels each presenting a periphery for rotatable support of said cart body on a support surface, said cart body presenting a forward and rearward end and having a rigid transverse cart handle mounted adjacent said rearward end, said cart handle presenting a longitudinal axis, said retrofit kit comprising:
   a braking assembly including
      a chock element including wedge structure for wedging engagement between the periphery of one of said cart wheels and the support surface;
      means for mounting said chock element adjacent one of said cart wheels for selective movement of said chock element between a braking position for impeding cart movement and thereby braking the cart and a non-braking position for permitted unimpeded cart movement, said chock element mounting means including retaining structure for captive retention of said chock element adjacent said wheel, and for selective shiftable movement of the chock element relative to said wheel;
   a handle assembly including
      a tubular body, graspable by a user, configured for telescopic placement over said handle and presenting two opposing ends;
      coupling means for pivotally supporting said tubular body ends on the cart body for selective pivotal movement of the tubular body substantially about said longitudinal axis of the cart handle for corresponding selective movement of said chock element from said braking position to said non-braking position when a user grasps and pivots said tubular body;
      biasing means proximal to and operably coupled with the tubular body for biasing said chock element toward said braking position; and
   an elongated element for interconnecting the braking assembly and the handle assembly.

8. The retrofit kit as set forth in claim 7, said cart body having a rearwardly disposed nesting panel pivotal between an open position and a closed position for allowing nesting of a plurality of carts when said panel is pivoted to said open position, said retrofit kit further including means for interconnecting said nesting panel with said braking assembly for shifting said chock element to said non-braking position when the panel pivots to said open position.

9. The retrofit kit as set forth in claim 7, said coupling means comprising a pair of rotor cup assembly, each rotor cup assembly including a stationary end cap for mounting to the cart body and a pivotal element for pivotal securement to said end cap and configured for receiving and supporting said tubular body and permitting said selective pivotal movement of the tubular body.

10. A retrofit kit adapted for mounting on a cart having a cart body, a plurality of support wheels each presenting a periphery for rotatable support of said cart body on a support surface said cart body presenting a forward and rearward end and having a rigid transverse cart handle mounted adjacent said rearward end, said cart handle presenting a longitudinal axis, said retrofit kit comprising:

a braking assembly including a chock element including wedge structure for wedging engagement between the periphery of one of said cart wheels and the support surface;

means for mounting said chock element adjacent one of said cart wheels for selective movement of said chock element between a braking position for impeding cart movement and thereby braking the cart and a non-braking position for permitted unimpeded cart movement said chock element mounting means including retaining structure for captive retention of said chock element adjacent said wheel, and for selective shiftable movement of the chock element relative to said wheel;

a handle assembly including a tubular body graspable by a user, configured for telescopic placement over said handle and presenting two opposing ends;

coupling means for pivotally supporting said tubular body ends on the cart body for selective pivotal movement of the tubular body substantially about said longitudinal axis of the cart handle for corresponding selective movement of said chock element from said braking position to said non-braking position when a user grasps and pivots said tubular body;

biasing means disposed within said handle assembly for biasing said chock element toward said braking position; and an elongated element for interconnecting the braking assembly and the handle assembly, said coupling means comprising a pair of rotor cup assembly, each rotor cup assembly including a stationary end cap for mounting to the cart body and a pivotal element for pivotal securement to said end cap and configured for receiving and supporting said tubular body and permitting said selective pivotal movement of the tubular body, said biasing means including an arcuate coil spring disposed within said rotor cup assembly for biasing said chock element toward said braking position.

11. A cart comprising:

a cart body;

a plurality of rotatable support wheels operatively coupled to said cart body for moveably supporting the cart body on a support surface, with each of the wheels presenting a periphery; and a braking mechanism being operatively connected to said cart and including a braking assembly that is selectively shiftable into and out of a braking position in which forward movement of the cart body is impeded, said braking assembly including a shiftable chock element having at least a portion thereof that is located generally forward of one of the wheels and is configured for wedging engagement between the periphery of the one wheel and the support surface when the braking assembly is in the braking position, said braking mechanism further including a selectively actuatable brake release operably coupled to the braking assembly to shift the braking assembly out of the braking position, and thereby shift the chock element out of said wedging engagement, when actuated.

12. The cart as set forth in claim 11, said braking mechanism including means for biasing said braking assembly toward said braking position.

13. A cart as set forth in claim 11, each of said wheels presenting a rotational axis, said chock element being mounted for shifting movement about an arcuate path that is generally concentric with the rotational axis of the one wheel.

14. A cart as set forth in claim 13, said chock element being shiftably mounted on the one wheel.

15. A cart as set forth in claim 11, said chock element being shiftably mounted on the one wheel.

16. A cart as set forth in claim 11, said brake release including a handle body that is manually shiftable into a release position to effect actuation of the brake release, wherein shifting of the handle body into the release position corresponds with shifting of the braking assembly out of the braking position.

17. A cart as set forth in claim 16, said handle body being biased out of the release position, such that the braking assembly is normally in the braking position unless the handle body has been manually shifted to the release position.

18. A cart comprising:

a cart body;

a plurality of rotatable support wheels operatively coupled to said cart body for moveably supporting the cart body on a support surface, with each of the wheels presenting a periphery; and a braking mechanism being operatively connected to said cart and including a braking assembly that is selectively shiftable into and out of a braking position in which forward movement of the cart body is impeded, said braking assembly including a shiftable chock element having at least a portion thereof that is located generally forward of one of the wheels and is configured for selective wedging engagement between the periphery of the one wheel and the support surface when the braking assembly is in the braking position, said chock element being shiftably mounted on the one wheel, said braking assembly including retaining structure configured to retain the chock element on the one wheel in a manner that permits wheel rotation relative to the chock element and shifting of the chock element relative to the wheel, said one wheel presenting oppositely facing annular recesses spaced radially inward from the periphery, said retaining structure including a pair of arms, each having a portion thereof configured to be received within a respective one the recesses.

19. A cart comprising:

a cart body;

a plurality of rotatable support wheels operatively coupled to said cart body for moveably supporting the cart body on a support surface, with each of the wheels presenting a rotatable exterior including a periphery; and a braking mechanism being operatively connected to said cart and including a braking assembly that is selectively shiftable into and out of a braking position in which movement of the cart body is impeded, said braking assembly including a chock element and retaining structure that are fixed relative one another, said chock element having at least a portion thereof configured for selective wedging engagement between the periphery of one of the wheels and the support surface when the braking assembly is in the braking position, said retaining structure shiftably engaging the rotatable exterior of the one wheel and cooperating therewith to shiftably support the chock element on the one wheel.

20. A cart as set forth in claim 19, said one wheel presenting oppositely facing annular recesses spaced radially inward from the periphery, said retaining structure including a pair of arms, each having a portion thereof configured to be received within a respective one of the recesses.

21. A cart as set forth in claim 19, said chock element and said retaining structure being separately formed components that are fastened to one another.

22. A cart comprising:

a cart body;

a plurality of rotatable support wheels operatively coupled to said cart body for moveably supporting the cart body on a support surface, with each of the wheels presenting a periphery; and a braking mechanism being operatively connected to said cart and including a braking assembly that is selectively shiftable into and out of a braking position in which movement of the cart body is impeded, said braking assembly including a chock clement that is shiftably mounted on one of the wheels and has at least a portion thereof configured for selective wedging engagement between the periphery of the one wheel and the support surface when the braking assembly is in the braking position, said braking assembly including retaining structure configured to retain the chock element on the one wheel in a manner that permits wheel rotation relative to the chock element and shifting of the chock element relative to the wheel, said one wheel presenting oppositely facing annular recesses spaced radially inward from the periphery, said retaining structure including a pair of arms, each having a portion thereof configured to be received within a respective one the recesses.

23. A cart comprising:

a cart body;

a plurality of rotatable support wheels operatively coupled to said cart body for moveably supporting the cart body on a support surface, with each of the wheels presenting a rotational axis and circular periphery that is generally concentric with the axis; and a braking mechanism being operatively connected to said cart and including a braking assembly that is selectively shiftable into and out of a braking position in which movement of the cart body is impeded, said braking assembly including a chock element that is mounted for shifting movement about an arcuate path that is generally concentric with the rotational axis of one of the wheels, said chock element having at least a portion thereof that is configured for selective wedging engagement between the periphery of the one wheel and the support surface when the braking assembly is in the braking position, said braking mechanism further including a selectively actuatable brake release operably coupled to the braking assembly to shift the braking assembly out of the braking position, and thereby shift the chock element out of said wedging engagement, when actuated.

24. A cart as set forth in claim 23, said chock element being shiftably mounted on the one wheel.

25. A cart as set forth in claim 23, said brake release including a handle body that is manually shiftable into a release position to effect actuation of the brake release, wherein shifting of the handle body into the release position corresponds with shifting of the braking assembly out of the braking position.

26. A cart as set forth in claim 25, said handle body being biased out of the release position, such that the braking assembly is normally in the braking position unless the handle body has been manually shifted to the release position.

27. A cart comprising:

a cart body;

a plurality of rotatable support wheels operatively coupled to said cart body for moveably supporting the cart body on a support surface, with each of the wheels presenting a rotatable exterior including a periphery; and a braking mechanism being operatively connected to said cart and including a braking assembly that is selectively shiftable into and out of a braking position in which movement of the cart body is impeded, said braking assembly including a chock element that is shiftably and substantially wholly mounted of the rotatable exterior of one of the wheels and has at least a portion thereof configured for selective wedging engagement between the periphery of the one wheel and the support surface when the braking assembly is in the braking position, said braking mechanism further including a selectively actuatable brake release operably coupled to the braking assembly to shift the braking assembly out of the braking position, and thereby shift the chock element out of said wedging engagement, when actuated.

* * * * *